Oct. 29, 1935.  G. L. POLLOCK ET AL  2,018,972
MOTOR DRIVEN VEHICLE
Filed Nov. 3, 1933  4 Sheets-Sheet 4
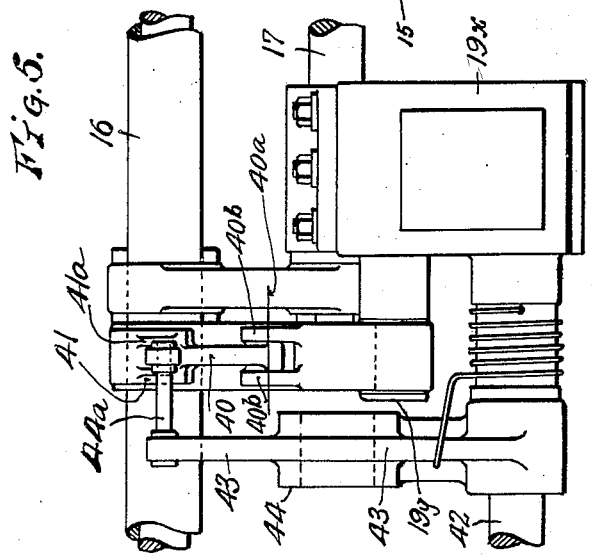

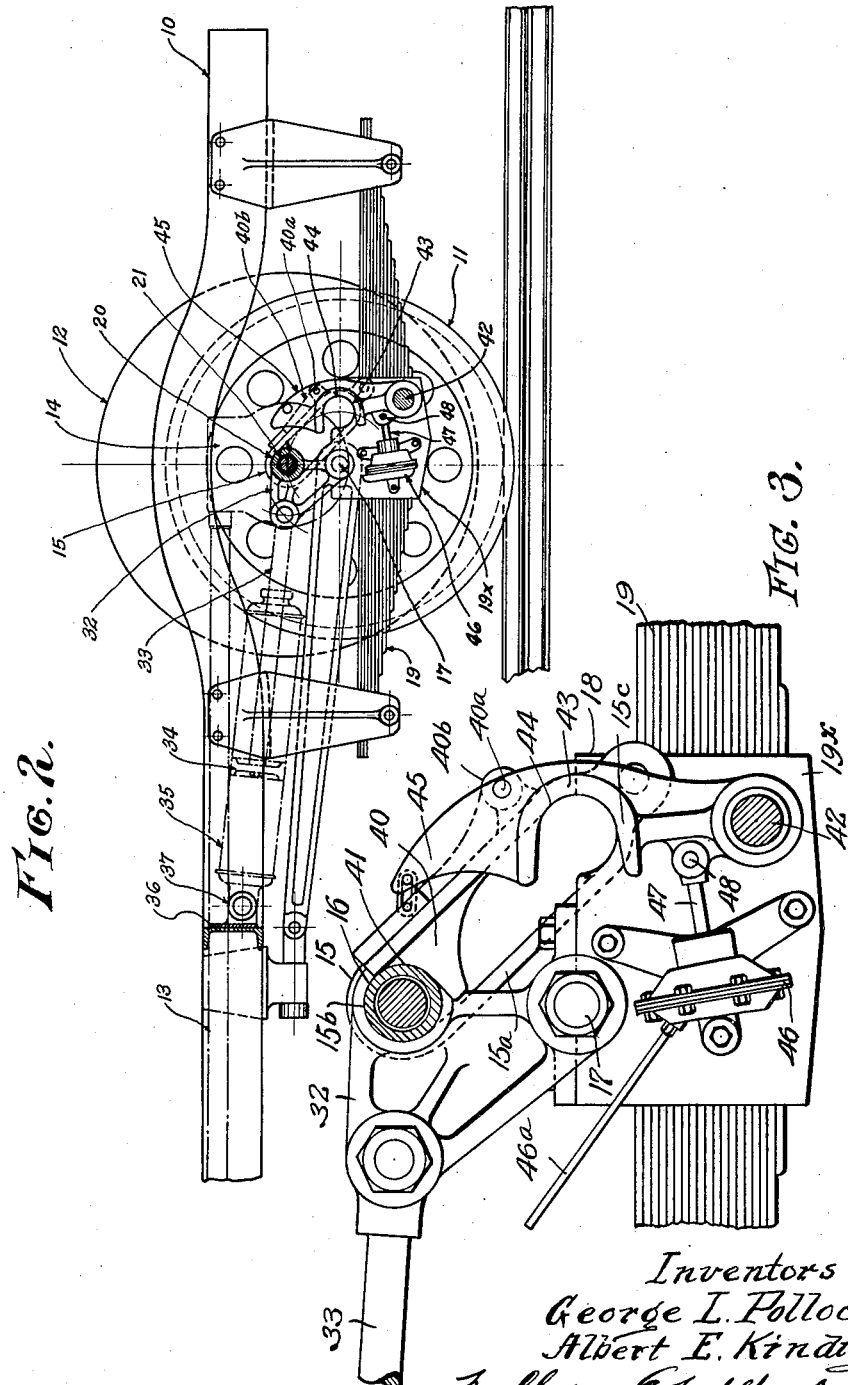

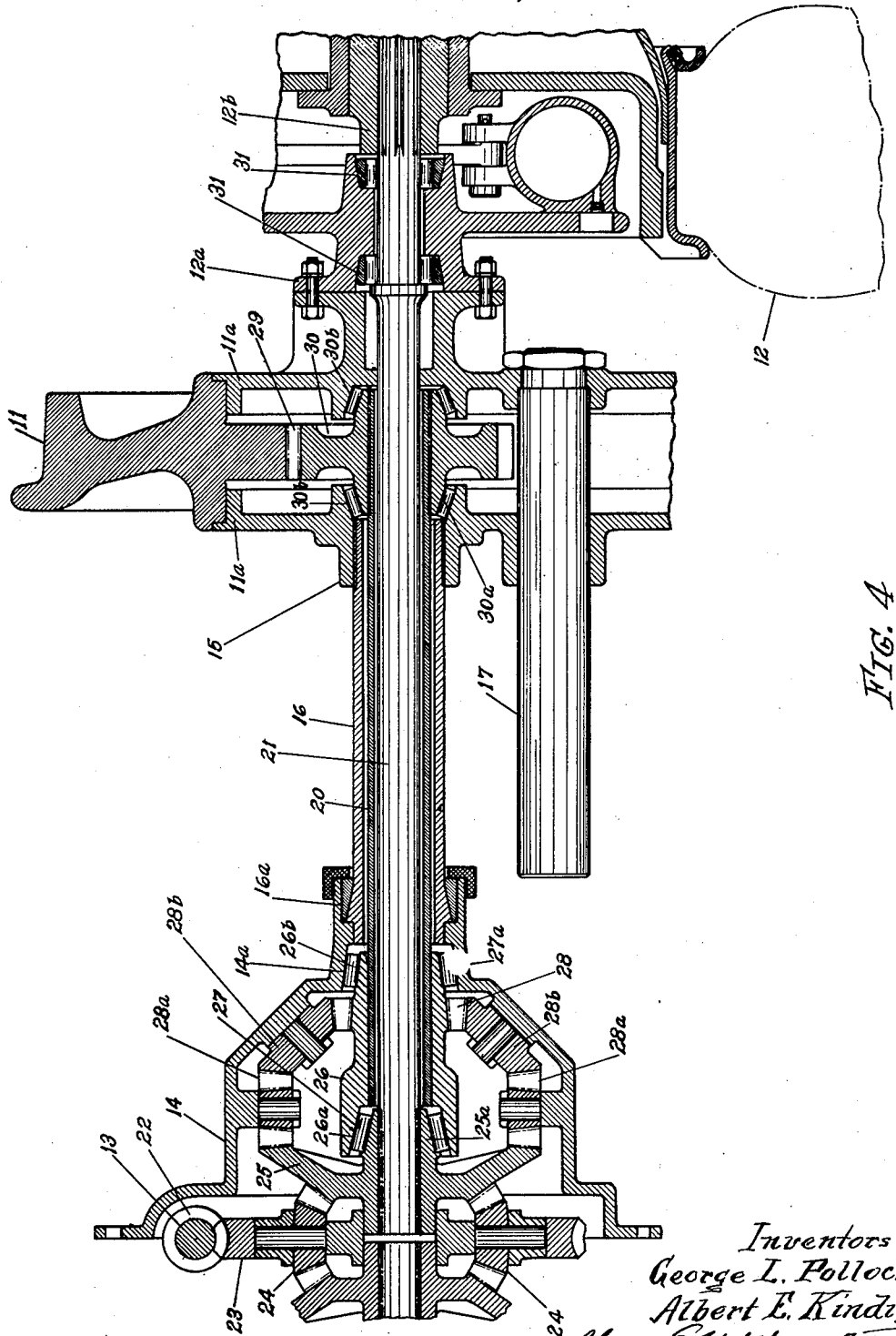

UNITED STATES PATENT OFFICE 2,018,972

MOTOR DRIVEN VEHICLE

George L. Pollock and Albert E. Kindig,
Chicago, Ill.

Application November 3, 1933, Serial No. 696,508

12 Claims. (Cl. 105—215)

This invention relates to improvements in motor driven vehicles and consists of the matters hereinafter described and more particularly pointed out in the appended claims.

The invention relates more particularly to a motor driven heavy van or truck which is provided with two sets of wheels—road wheels and rail wheels—with the wheels of the sets severally arranged adjacent to and in planes parallel to each other and with the two sets so mounted with reference to the body of the vehicle that the one set or the other set of wheels may be brought to traction position to engage the road or the rails, as the case may be.

One object of the invention is to provide novel and improved axle housings each connected to the differential casing, with a duplex axle drive for the traction rail and road wheels and with the housings capable of a shifting movement to bring either set—the rail or road wheels—into traction position.

Another object of the invention is to provide a simple and efficient power driven actuating means operable from the driving seat for shifting or rotating said housings to bring one or the other set of traction wheels to traction position.

Another object of the invention is to provide a simple and efficient automatically actuated guiding and locking means for rigidly holding said housings in either of the two described positions, with automatic releasing devices to permit movement of said housings, when such movement is required to shift said housings from one position to the other.

The advantages of the invention and the wide field for its commercial adoption and use will appear more fully as we proceed with our specification.

In the drawings:—

Figure 2 is a side elevation of the rear end of the chassis with the traction wheels attached thereto and illustrating the relative positions of the two kinds of traction wheels with the rail wheels in operative traction engagement with rails.

Figure 3 is a view representing on an enlarged scale in side elevation (partly in section) a detail of the mounting of one of the housings and of the mechanism for shifting it and locking it in its two positions.

Figure 4 is a view on an enlarged scale representing a vertical section of Figure 1 in the vertical plane containing the horizontal axis of the differential gearing.

Figure 5 is a view in rear elevation of the parts shown in Figure 3.

Figure 6 is a view similar to Figure 3, showing the parts in a different position.

Figure 1:
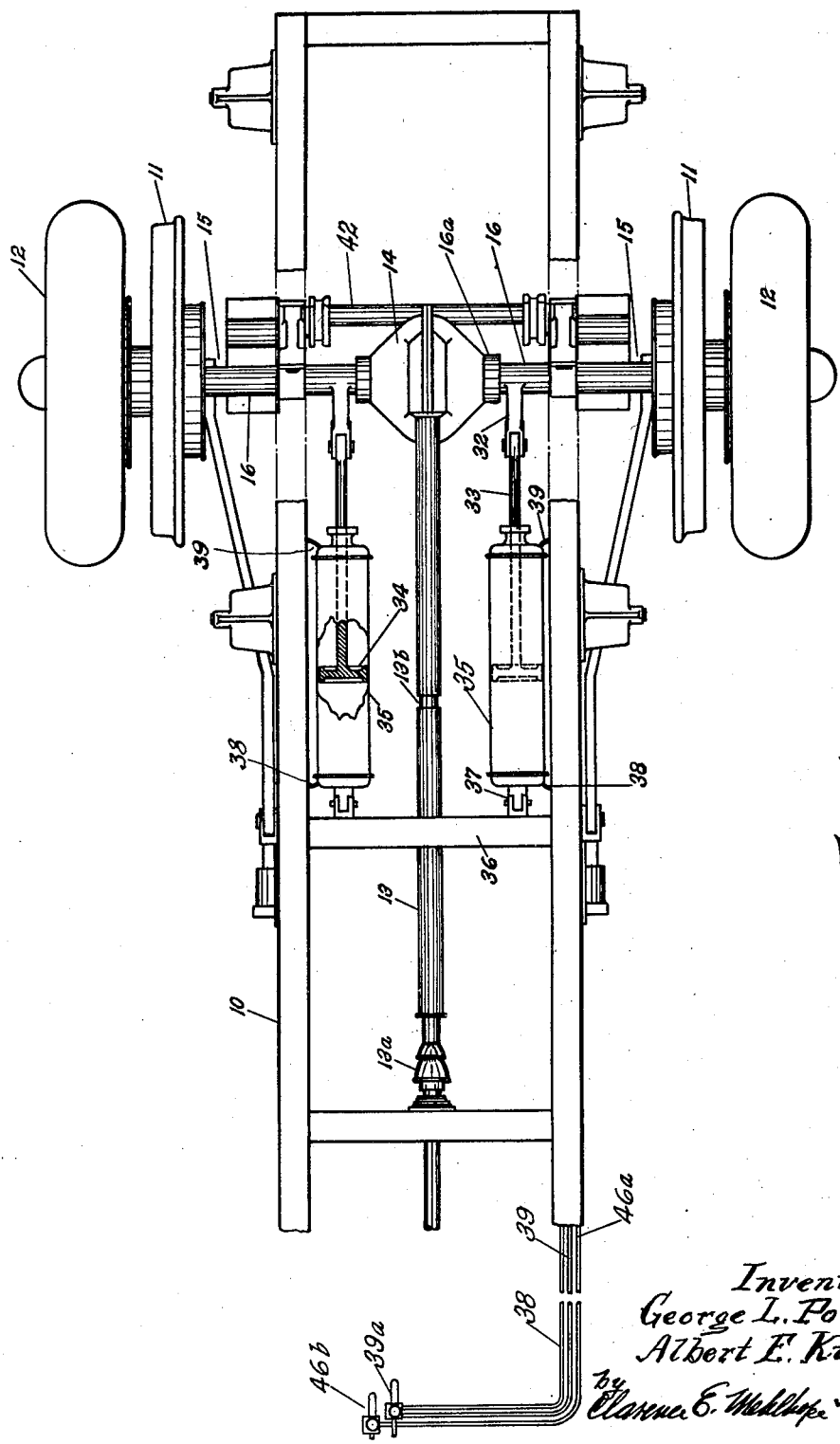
Figure 1 is a view representing a top plan of the rear end of the chassis with the body removed, showing the two pairs of traction wheels, namely, the road wheels and the rail wheels, together with their means of mounting and connection to the differential gear casing and propeller shaft.

Referring now to that embodiment of the invention illustrated in the drawings:—

10 indicates the chassis of a motor driven vehicle, as a heavy truck or van, of any suitable design with the improvements of the invention applied thereto. 11, 11 indicate a pair of rear flanged traction wheels adapted to run on rails in a familiar manner. Mounted adjacent to, outside of or beyond said rail wheels are traction road wheels 12, 12. Power for driving the vehicle, as illustrated herein, is applied as is usual to the rear set of traction wheels, namely, the wheels 11, 11 and the wheels 12, 12.

13 indicates the propeller shaft running longitudinally of the chassis and connecting the motor through the change speed box to the differential gearing enclosed in the differential casing 14. It will be understood that the differential gear casing and gearing, the floating axles and their connections to the traction wheels are the same on both sides, so that a description of one will suffice.

15 indicates a housing extending laterally from the differential casing 14. It comprises a horizontal tubular casing 16 enclosing the floating axles for driving a traction rail wheel 11 and a traction road wheel 12, respectively, and laterally spaced hubs 11a, 12a rigidly connected to the outer end of said tubular casing. The inner end of said casing 16 is connected to the differential casing in the usual manner, except that the connecting means 16a permits a limited rotative movement of said casing about its longitudinal central axis. The housing 15 is mounted as a whole upon a horizontal stud 17, parallel to but spaced below the tubular casing 16, mounted on a saddle or stirrup 18 (see Figure 3) carried by a rear spring 19 connected to the chassis in a familiar manner.

For purposes of assembly, the hub 11a for the rail wheel 11 is made in two parts, to the outer one of which the hub 12a for the road wheel 12 is bolted, as shown in Figure 4. The housing 15 as a whole is rotatable on the stud 17 through an angle of approximately 90 degrees. As shown in the drawings, with the tubular casing 16 vertically above the stud 17, the parts are so designed that the rail wheel 11 will be in traction position with its bottom tread below the tread of the road wheel 12. When the housing 15 is rotated upon the stud 17 through an angle of approximately 90 degrees, the road wheel 12 will be brought to traction position with its tread below the tread of the rail wheel 11. The distance of the tread of the road wheel below the tread of the rail wheel in the second case is somewhat increased by reason of the fact that the road wheel is of slightly larger diameter than the rail wheel. To permit the movement of the differential casing 14 in the above described movement of the housing 15, the propeller shaft 13 is provided with a joint 13a and with a telescopic joint 13b.

Within the tubular casing 16 and concentric therewith and extending into the differential casing 14, is a tubular floating axle 20 and within said tubular axle a second floating axle 21. The tubular axle 20 is for driving the rail wheel 11 and the axle 21 is for driving the road wheel 12.

The propeller shaft 13 is provided in the differential casing 14 with a worm 22 which engages a worm wheel 23 carrying pinions 24 for driving the usual ring gear 25. Said gear 25 is fixed to the axle 21, which drives the road wheel 12. The tubular axle 20 has fixed to its end within the differential casing 14 a long tubular hub 26. The end of said hub proximate to the vertical plane of the propeller shaft 13 is flared outwardly at 26a to embrace and have bearing upon a conical hub 25a of the ring gear 25, a roller bearing indicated at 27 being interposed between the two. The outer end of the hub 26 is tapered to provide a conical bearing part 26b which bears in a correspondingly tapered part 14a of the housing 14 with a roller bearing 27a interposed between. The hub 26 has fixed to or made integral with it, a beveled gear 28 adjacent to its outer end. This gear is driven from the ring gear 25 through idle gears 28a, 28b suitably mounted on studs projecting inwardly from the walls of the differential casing, as clearly shown in Figure 4. It will be obvious from the foregoing description that the ring gear 25 will drive the hollow axle 20 for the rail wheel at a higher rate of speed through the idle gears 28a, 28b and the gear 28 than it will drive the axle 21 for the road wheel to which axle it is directly connected.

The rail wheel 11 is in the form of a large ring bearing upon the hub parts 11a, 11a of the housing 15 with an internal toothed flange or internal gear 29 which is concentric with the stud 17 and is located between the hub parts 11a, 11a. A spur gear 30 is fixed to the tubular axle 20 in the plane of and engaged with the said internal gear 29. Said gear 30 has a hub with conical ends 30a projecting beyond the plane of the gear and having bearing within conical flanges 30b, 30b in the hub part of the housing 15, with suitable roller bearings interposed between.

The axle 21 projects beyond the plane of the rail wheel 11, through the hub part 12a of the housing 15, within which it has bearing, as indicated at 31, 31 and beyond which it is directly connected to the hub 12b of the road wheel 12 in a familiar manner.

It will thus be obvious that the two wheels, the rail wheel and the road wheel, will be simultaneously driven through the differential gearing by the propeller shaft 13.

We now pass to a description of the means for shifting or rotating the housings 15 on their studs 17 to bring one or the other set of wheels to traction position and the means for locking said housings in either of said positions.

Each housing 15 has connected to it near the differential casing a bracket arm 32 (see Figures 1 and 3). To this bracket arm is pivotally connected a piston rod 33 of a piston 34 in a cylinder 35 which is pivotally connected at its head end to a cross bar 36 of the chassis, as shown at 37. By admitting air under pressure at the one or the other end of the cylinder 35 through pipes 38 or 39 (controlled by a hand valve 39a), it is obvious that the piston will be moved in one direction or the other to shift the housing 15 from the position shown in the drawings and particularly in Figure 3, to the position shown at right angles thereto, as in Figure 6, and from the second position back to the first position again.

The tubular casing 16 of the housing 15 is engaged in a forwardly and upwardly inclined slotted guide 15a, the curved ends of which, 15b, 15c, present stops to limit the movement of the said casing 16 and consequently the rocking movement of the housing 15 on the stud 17. Said housing is normally locked in the position shown in Figure 3 by means of a lock arm 40 having a suitable concave jaw 41, which operates through a slot in the guide 15a, for engagement with the tubular casing 16 to hold it against the stop end 15b of the guide 15a. The lock arm 40 is pivotally mounted on a transverse pin 40a connected to ears 40b rising from the guide 15a. The guide 15a is pivoted to swing in a vertical plane adjacent the proximate spring box or hanger 19x on a horizontal stud 19y. A spring-controlled, forwardly pressed, second lock arm 43 (see Figures 3 and 5) is mounted on a rod 42 extending between and supported by the spring hangers 19x, to swing in a vertical plane adjacent to the first named lock arm 40. The lock arm 43 has a concave jaw 44 for engagement with the tubular casing 16 of the housing 15 when said housing has been rocked to its lower limit of movement with its tubular casing 16 arrested by the stop end 15c of the guide 15a. Said lock arm 43 carries at its upper end (which projects above the jaw 44 and above the pivot pin 40a of the lock arm 40) a laterally extending horizontal pin 44a (see Figs. 5 and 6) which engages one end of a link, the other end of which is connected to the lock arm 40, providing a lost motion connection therewith, so that in the forward movement of the arm 43, the arm 40 will be directly engaged to swing the jaw 41 into locking position, whereas a reverse rearward movement of the arm 43 will withdraw said jaw 41 from locking position. A trip cam 45 projects in advance of the jaw 44 of the spring-controlled lock arm 43 in position to be struck by the tubular casing 16 of the housing 15 when said housing is swung on the stud 17, so that the jaw 44 of said arm 43 will be swung out of the path of the tubular casing 16 to permit said casing to reach the stop end 15c of the guide 15a, when the spring-controlled arm 43 will be snapped forward to bring its jaw 44 to locking engagement with the tubular casing 16, as shown in Figure 6.

46 indicates a pressure chamber containing a piston with a piston rod 47 which is pivotally connected to the lock arm 43 at 48. The pressure in the chamber 46 is provided by air admitted through a pipe 46a and controlled by a hand valve 46b. Both the hand valves 39a and 46b are preferably located at or near the driver's seat.

Air is introduced through the pipe 38 into the head end of the cylinder 35 and through the pipe 46a into the pressure chamber 46,—the latter in advance of the former. The air introduced into the pressure chamber 46 will cause the piston rod 49 to swing the spring-controlled lock arm 43 and with it the lock arm 40 and its jaw 41 out of the path of the tubular casing 16, so as to permit the rotative or rocking movement of the housing 15 on the stud 17, the latter being brought about by the movement of the piston in the cylinder 35. It will, of course, be understood that in this movement the spur gear 30 will run idly over the internal gear 29 of the rail wheel 11. In the movement of the housing 15, the tubular casing 16 strikes the cam part 45 of the spring-controlled lock arm 43 and forces said arm to swing further back to permit the tubular casing 16 to pass to the stop end 15c of the guide 15a, when the spring-controlled arm 43 finally snaps back to bring its jaw 44 into locking engagement, with the tubular casing 16 against the said stop end 15c, to hold the housing 15 in its rearward position. (See Figure 6). In this position of the housing, the road wheels are in traction position.

To reverse the movement of the housing and bring it to place where the rail wheels are in traction position, the operator again admits air to the pressure chamber 46 and to the inner end of the cylinder 35, in the manner hereinbefore described. This causes the piston rod 47 to shift to the right to move the jaw 44 of the spring-controlled arm 43 from its engagement with the tubular casing 16, followed by the movement of the piston rod 33 to the left, so as to swing the housing back to its original position, whereupon the tubular casing 16 will be again engaged by the jaw 41 of the lock arm 40, having been forced into such engagement by the spring-controlled arm 43 which snaps back to its normal position, as shown in Figure 3, when the tubular casing reaches the upper end of the guide 15a.

It will be understood that in describing the operation of one of the housings 15, as hereinbefore, said description applies equally to the other housing, since the parts are duplicated on the two sides of the differential casing 14 and the air pipes 38, 39 are connected to the two cylinders 35 and the air pipe 46a is connected to the two pressure chambers 46.

In the embodiment of the invention shown in the drawings, in the movements of the two housings, their tubular casings always have engagement in their respective slotted guides 15a, the ends of which limit and determine the extent of their movement,—the pivotal movement of said slotted guide on the studs 19y permitting the required shifting of said guides to accommodate the movement of the tubular casings 16 in their arcuate paths about the stud 17.

The spring-controlled lock arms 43 normally seek their forward position, being dislodged therefrom only by the operation of the piston rods 47. The arms 43, through their lost motion connection with the lock arms 40, likewise tend to hold said lock arms 40 in their forward positions. The cam part 45 of the lock arms 43 ensures the complete removal of any parts of the lock arms 43 from the paths of the tubular casings 16 when the housings 15 are shifted from their forward position, as shown in Figure 3, to their rearward position, as shown in Figure 6.

We claim as our invention:

1. In a duplex traction drive for motor driven vehicles having rail and road wheels, a differential gearing and casing therefor, housings rotatably connected to and extending laterally at each side of said differential casing, said housings having horizontally spaced hubs at their outer ends with the axes of said hubs laterally spaced, a tubular axle and a second axle within and concentric therewith, the second axle extending beyond the tubular axle and both axles having bearing in said housings and in said differential casing, means severally connecting said axles to said differential gearing, studs upon which said housings are rotatably mounted, rail wheels mounted on the inner pair of said hubs, internal gearings connecting said rail wheels with said tubular axles, and road wheels mounted on said outer pair of hubs and directly connected to said second axles.

2. In a duplex traction drive for motor driven vehicles having rail and road wheels, a differential gearing and casing therefor, housings rotatably connected to and extending laterally at each side of said differential casing, said housings having horizontally spaced hubs at their outer ends with the axes of said hubs laterally spaced, a tubular axle and a second axle within and concentric therewith, the second axle extending beyond the tubular axle and both axles having bearing in said housings and in said differential casing, means severally connecting said axles to said differential gearing, studs upon which said housings are rotatably mounted, rail wheels mounted on the inner pair of said hubs, internal gearings connecting said rail wheels with said tubular axles, road wheels mounted on said outer pair of hubs and directly connected to said second axles, and means for rocking said housings on said studs.

3. In a duplex traction drive for motor driven vehicles having rail and road wheels, a differential gearing and casing therefor, housings rotatably connected to and extending laterally at each side of said differential casing, said housings having horizontally spaced hubs at their outer ends with the axes of said hubs laterally spaced, a tubular axle and a second axle within and concentric therewith, the second axle extending beyond the tubular axle and both axles having bearing in said housings and in said differential casing, means severally connecting said axles to said differential gearing, studs upon which said housings are rotatably mounted, rail wheels mounted on the inner pair of said hubs, internal gearings connecting said rail wheels with said tubular axles, and road wheels mounted on said outer pair of hubs and directly connected to said second axles, means for rocking said housings on said studs through a predetermined arc to bring one or the other pair of rail or road wheels to traction position, and means for automatically locking said housings when in positions at the ends of said arc.

4. In a duplex traction drive for motor driven vehicles having rail and road wheels, a differential gearing and casing therefor, housings connected to and extending laterally at each side of said differential casing, said housings having horizontally spaced hubs at their outer ends with the axes of said hubs laterally spaced, a tubular axle and a second axle concentric therewith mounted in each housing and severally connected to said differential gearing, the second axle extending beyond the tubular axle, horizontal studs upon which said housings are rotatably mounted, rail wheels mounted on the inner pair of said hubs, internal gearings concentric with said horizontal studs connecting said rail wheels with said tubular axles, and road wheels mounted on said outer pair of hubs and directly connected to said second axle.

5. In a duplex traction drive for motor driven vehicles having rail and road wheels, a housing having horizontally spaced hubs at its outer end with the axes of said hubs laterally spaced, a horizontal stud upon which said housing is rotatably mounted, means for rocking said housing on said stud, a guideway in which said housing is engaged, said guideway having closed ends limiting the rocking movement of said housing on its stud, devices for severally engaging said housing to lock it at the two ends of said guideway, and means for severally releasing said devices.

6. In a duplex traction drive for motor driven vehicles having rail and road wheels, a horizontal housing having laterally spaced hubs at its outer end with the axes of said hubs horizontally spaced, a horizontal stud upon which said housing is rotatably mounted, means for rocking said housing on said stud, a guideway in which said housing is engaged, said guideway presenting stops at its opposite ends to limit the rocking movement of said housing, a spring-controlled pivoted lock arm adapted for locking engagement with said housing in said guideway adjacent its pivoted end, a second lock arm pivoted to said guideway adapted to lock said housing at the other end of said guideway, means operably connecting said two lock arms, and actuating means for releasing said lock arms from their respective engagements with said housing.

7. In a duplex traction drive for motor driven vehicles having rail and road wheels, a horizontal housing having horizontally spaced hubs at its outer end with the axes of said hubs laterally spaced, a horizontal stud upon which said housing is rotatably mounted, means for rocking said housing on said stud, a guideway in which said housing is engaged, said guideway presenting stops at its opposite ends to limit the rocking movement of said housing, a spring-controlled pivoted lock arm adapted for locking engagement with said housing in said guideway adjacent its pivoted end, a second lock arm pivoted to said guideway adapted to lock said housing at the other end of said guideway, lost motion means connecting said first named lock arm to said second named lock arm, and actuating means for releasing said lock arms from their respective engagements with said housing.

8. In a duplex traction drive for motor driven vehicles having rail and road wheels, a horizontal housing having horizontally spaced hubs at its outer end with the axes of said hubs laterally spaced, a horizontal stud upon which said housing is rotatably mounted, means for rocking said housing on said stud, a guideway in which said housing is engaged, said guideway presenting stops at its opposite ends to limit the rocking movement of said housing, a spring-controlled pivoted lock arm adapted for locking engagement with said housing in said guide way adjacent its pivoted end, a second lock arm pivoted to said guideway adapted to lock said housing at the other end of said guideway, lost motion means connecting said first named lock arm to said second named lock arm, and actuating means for releasing said lock arms from their respective engagements with said housing; said first named lock arm being provided with a cam part adapted to be engaged by said housing at a point intermediate the ends of said guideway.

9. In a duplex traction drive for motor driven vehicles having rail and road wheels, a horizontal housing having horizontally spaced hubs at its outer end with the axes of said hubs laterally spaced, a horizontal stud upon which said housing is rotatably mounted, pneumatic means for rocking said housing on said stud, a guideway in which said housing is engaged, said guideway presenting stops at its opposite ends to limit the rocking movement of said housing, a spring-controlled pivoted lock arm adapted for locking engagement with said housing in said guideway adjacent its pivoted end, a second lock arm pivoted to said guideway adapted to lock said housing at the other end of said guideway, means operably connecting said two lock arms, and pneumatic means for swinging said first named pivoted lock arm from its engaging position.

10. In a duplex traction drive for motor driven vehicles having rail and road wheels, a horizontal housing having horizontally spaced hubs at its outer end with the axes of said hubs laterally spaced, a horizontal stud upon which said housing is rotatably mounted, pneumatic means for rocking said housing on said stud, a guideway in which said housing is engaged, said guideway presenting stops at its opposite ends to limit the rocking movement of said housing, a spring-controlled pivoted lock arm adapted for locking engagement with said housing in said guideway adjacent its pivoted end, a second lock arm pivoted to said guideway adapted to lock said housing at the other end of said guideway, lost motion means connecting said first named lock arm to said second named lock arm, and pneumatic means for swinging said first named pivoted lock arm from its engaging position.

11. In a duplex traction drive for motor driven vehicles having rail and road wheels, a horizontal housing having horizontally spaced hubs at its outer end with the axes of said hubs laterally spaced, a horizontal stud upon which said housing is rotatably mounted, pneumatic means for rocking said housing on said stud, a guideway in which said housing is engaged, said guideway presenting stops at its opposite ends to limit the rocking movement of said housing, a spring-controlled pivoted lock arm adapted for locking engagement with said housing in said guideway adjacent its pivoted end, a second lock arm pivoted to said guideway adapted to lock said housing at the other end of said guideway, lost motion means connecting said first named lock arm to said second named lock arm, said first named lock arm being provided with a cam part adapted to be engaged by said housing at a point intermediate the ends of said guideway, and pneumatic means for swinging said first named pivoted lock arm from its engaging position.

12. In a duplex traction drive for motor driven vehicles having rail and road wheels, including a housing with horizontally spaced hubs with the axes of said hubs laterally spaced, a stud upon which said housing is rotatably mounted, a bracket arm fixed to said housing and extending laterally therefrom, a stirrup for supporting said stud, and means for actuating said bracket arm to rock said housing on said stud.

GEORGE L. POLLOCK.
ALBERT E. KINDIG.